United States Patent [19]

Gillespie et al.

[11] Patent Number: 5,713,044
[45] Date of Patent: Jan. 27, 1998

[54] SYSTEM FOR CREATING NEW GROUP OF CHAIN DESCRIPTORS BY UPDATING LINK VALUE OF LAST DESCRIPTOR OF GROUP AND REREADING LINK VALUE OF THE UPDATING DESCRIPTOR

[75] Inventors: Byron Gillespie, Phoenix; Elliot Garbus, Scottsdale, both of Ariz.; William Futral, Portland, Oreg.

[73] Assignee: Intel Corporation, Santa Clara, Calif.

[21] Appl. No.: 575,663

[22] Filed: Dec. 19, 1995

[51] Int. Cl.$^6$ ............................................. G06F 15/02
[52] U.S. Cl. ............................................. 395/842
[58] Field of Search .......................... 395/842, 800, 395/843–846, 309–311, 280

[56] References Cited

U.S. PATENT DOCUMENTS

| | | | |
|---|---|---|---|
| 5,077,664 | 12/1991 | Taniai et al. | 395/842 |
| 5,251,312 | 10/1993 | Sodos | 395/844 |
| 5,367,639 | 11/1994 | Sodos | 395/844 |
| 5,438,665 | 8/1995 | Taniai et al. | 395/845 |
| 5,448,702 | 9/1995 | Garcia, Jr. et al. | 395/280 |
| 5,513,368 | 4/1996 | Garcia, Jr. et al. | 395/842 |
| 5,542,053 | 7/1996 | Bland et al. | 395/309 |

*Primary Examiner*—Moustafa M. Meky
*Attorney, Agent, or Firm*—Blakely, Sokoloff, Taylor & Zafman

[57] ABSTRACT

Dynamic appending of chain descriptors is described with reference to a computer system having a host processor, a DMA unit, a host memory and an external memory wherein the DMA unit controls transference of data between the host memory and the external memory based upon data transference parameters specified in chain descriptors created by the host processor and stored as data structures within the host memory. In accordance with one method and apparatus described herein, dynamic appending of chain descriptors is achieved by employing a resume bit stored within a register of the DMA unit. The host processor, upon creating a new group of chain descriptors to be appended to a previous group, updates a link value within a last chain descriptor of the previous group to point to the first chain descriptor of the new group and also sets the resume bit within the DMA unit. The DMA unit reads chain descriptor parameters, including link values, they perform a data transfer operation specified by the chain descriptor parameters. Upon completion of the transfer operation, the DMA unit examines the resume bit and, if set, the DMA unit rereads the link value for the current chain descriptor. If the resume bit has not been reset, the DMA unit merely proceeds to process the next chain descriptor specified by the previously read link value or, if that link value is a null value, the DMA unit merely terminates operation. In an alternative embodiment described herein, the host processor updates link values but does not set a resume bit within the DMA unit. Rather, the DMA unit initially reads all parameters for a chain descriptor except for the link value. Then, after completion of the data transfer operation specified by the chain descriptor, the data unit reaccesses the chain descriptor to read the link value. Hence, if the link value is updated by the host processor while the DMA unit is processing a chain descriptor, the DMA unit will nevertheless access the updated link value upon completion of the data transference operation. Method and apparatus embodiments are described herein.

14 Claims, 7 Drawing Sheets

SYSTEM FOR CREATING NEW GROUP OF CHAIN DESCRIPTORS BY UPDATING LINK VALUE OF LAST DESCRIPTOR OF GROUP AND REREADING LINK VALUE OF THE UPDATING DESCRIPTOR

BACKGROUND OF THE INVENTION

1. Field of the Invention

The invention generally relates to computer systems having direct memory access (DMA) units and in particular to chain descriptors employed by a DMA unit.

2. Description of Related Art

State of the art computer systems often employ DMA units to facilitate transference of data from one memory to another, in part, to eliminate the need for a host microprocessor to control the data transfer itself. Rather, the host processor merely provides information for the DMA unit specifying a data transfer operation, then the DMA handles the actual data transfer. FIG. 1 illustrates a simplified computer system 10 having a host microprocessor 12, a DMA unit 14, a local memory 16 and an external memory 18. Local memory 16 is connected directly to microprocessor 12 and is directly accessible thereby. External memory 18 is not directly accessible by the microprocessor and may represent, for example, memory accessible only through a personal computer interface (PCI) bus (not separately shown in FIG. 1).

A number of techniques have been developed for allowing a microprocessor to indicate to the DMA unit the data that needs to be transferred. In one such technique, the microprocessor creates a set of chain descriptors each specifying a block of data to be transferred by the DMA unit. The chain descriptors are stored in the host memory and are accessible by the DMA unit. Each chain descriptor specifies a block of data to be transferred by indicating, among other things, the initial address and length of the block data. The chain descriptor may specify data to be transferred from the host memory to the external memory or vice versa.

Often, the host processor creates an entire group or set of chain descriptors specifying a group of data transference operations to be performed in sequence by the DMA unit. Each chain descriptor includes a link value specifying the address of the next chain descriptor, if any, within the host memory. As such, the group of chain descriptors provides a link list.

FIG. 2 illustrates a first group of chain descriptors 20 with individual chain descriptors identified by reference numerals $22_1$ through $22_N$. Each includes a link value, $24_1$ through $24_N$, respectively, specifying the address within the host memory of the next chain descriptor in the group. For example, link value $24_1$ of chain descriptor $22_1$ specifies the address of chain descriptor $22_2$. The link value $24_N$ of the last chain descriptor $22_N$ in the group includes a null value indicating that there are no further chain descriptors in the group.

In use, the host processor creates and stores a group of chain descriptors within the host memory, then activates DMA unit. The DMA unit accesses the host memory to read the data transference parameters for the first chain descriptor then performs the data transference operations specified therein. The actual parameters for the data transference, including the link list values specifying the next chain descriptor, are stored temporarily within registers within the DMA unit (not separately shown). Upon completion of the data transfer operation specified by the first chain descriptor, the DMA unit accesses the host memory at the address specified by the link value of the first chain descriptor to retrieve the data transfer parameters for the second chain descriptor then proceeds to perform the data transfer operations specified therein. This process continues until all chain descriptors in the group have been processed after which the DMA unit resets to an inactive state. The DMA unit identifies the last chain descriptor in the group by detecting a null value in the link value.

Often, however, while the DMA unit is performing the data transfer operations specified by a first group of chain descriptors, the host processor specifies additional data transference operations by creating additional chain descriptors. In FIG. 2, an additional group of chain descriptors 26 is shown including individual chain descriptors $28_1$ through $28_4$ each having link values $30_1$ through $30_4$, respectively. When additional chain descriptors are created, it is desirable to append the new chain descriptors to the previous group of chain descriptors to allow the DMA unit to process all the chain descriptors in one uninterrupted sequence of data transfer operations. Without the ability to append new chain descriptors, the DMA unit will deactivate upon completion of the data transfer operation specified by the last chain descriptor of the first group. Then, the host processor will need to restart the DMA unit to handle the data transfer operations specified by the new group of chain descriptors. Significant time delays may occur between completion of the data transfer of the chain descriptor of the first group and initiation of the data transfer operation of the chain descriptor of the second group. Such represents wasted overall processing time which may unduly impact overall computer system performance.

One simple technique for appending chain descriptors is for the host processor merely to update the link value of the last chain descriptor of the first group to identify the address of the first chain descriptor of the second group. However, without knowing which chain descriptor is currently being processed by the DMA unit, the host processor cannot reliably update the link value of the last chain descriptor. If the DMA unit is already performing the data transfer operation specified by the last chain descriptor, then the DMA unit will already have read the null link value from the last chain descriptor into its internal registers and will not receive the updated link value. As such, the DMA unit will deactivate after completion of the last chain descriptor of the first group without processing any of the chain descriptors of the appended group. Software within the host processor will need to detect that the appended DMA chain descriptors have not been processed and restart the DMA unit specifying the first chain descriptor of the appended group, but such may result in a significant performance penalty.

To partially remedy this problem, some conventional computer systems have employed a more sophisticated technique for appending chain descriptors. The host processor first attempts to determine which DMA chain descriptor is currently being processed by the DMA unit before updating the link value of the last chain descriptor. To this end, the host unit examines registers within the DMA unit itself. If the DMA unit is processing any chain descriptor up to and including the third to the last chain descriptor of the first group ($22_{N-2}$), then the host processor merely updates the link value of the last chain descriptor $22_N$. If, however, the DMA unit is found to be processing the second to last chain descriptor of the first group ($22_{N-1}$), then the host processor stops the DMA unit to prevent further data transfers, updates the link value of the last chain descriptor of the first group ($22_N$), then restarts the DMA unit. The host processor stops operation of the DMA unit, in that case, because the host processor cannot reliably update the link value of the last chain descriptor without significant risk that the DMA unit will complete the data transfer operations specified by the second to last chain descriptor ($22_{N-1}$) before the link value is updated in the last chain descriptor ($22_N$) resulting in the condition described above wherein the DMA unit deactivates before processing any of the appended chain descriptors. If the host processor determines that the DMA is processing the last chain descriptor $22_N$, then the host processor does not update the link value of the last chain descriptor because the link value has already been read by the DMA unit and transferred into its internal registers. Accordingly, the host processor merely allows the DMA unit to deactivate, then the host processor restarts the DMA unit specifying the first chain descriptor of the second group ($28_1$).

As can be appreciated, the foregoing technique requires development and maintenance of software for running on the host processor capable of handling each of the above-described conditions. It would be desirable to provide an improved method and apparatus for appending chain descriptors which does not require such software within the host processor. Moreover, even with appropriate software, significant time penalties may occur if the host processor attempts to append the chain descriptors while the DMA unit is processing either the last or second to last chain descriptor of a previous group. Indeed, even if the DMA unit is found to be processing one of the other chain descriptors, an overall time penalty may occur as a result of the need to rely on software, rather than hardware, to implement the above-described logic. Accordingly, it is also desirable to provide an improved method and apparatus for appending chain descriptors which substantially eliminates such timing penalties. It is these ends that aspects of the present invention are drawn.

SUMMARY OF THE INVENTION

In accordance with one aspect of the invention, an improved method and apparatus for appending chain descriptors for use by a DMA unit of a computer system is provided. To append chain descriptors, a host processor of the computer system updates the link value of the last chain descriptor of a previous group to identify the first chain descriptor of a group to be appended and sets a value, herein referred to as a "resume" value or "update condition" value, within a register of the DMA unit indicating that a link value has been updated. The DMA unit, upon completion of the data transference operation of each chain descriptor, examines the resume value and, if set, the DMA unit rereads the link value of the chain descriptor for the data transference operation just completed then accesses the next chain descriptor, if any, based upon the reread link value. If the resume value is not set, the DMA unit merely accesses the chain descriptor specified by the previously read link value, if any. The DMA unit resets the resume value whenever the DMA unit detects that the resume value has been set. In one embodiment, the resume value is a simple "resume bit".

With this arrangement, the dynamic appending of chain descriptors is achieved without requiring complicated logic to be performed by the host processor and without requiring the host processor to turn off the DMA unit as required in some dynamic appending techniques of the prior art. Rather, to append additional chain descriptors, the host processor merely updates the link value of the last chain descriptor of the previous group, then sets the resume value within the DMA unit. The DMA unit merely reads the resume value upon completion of processing of each chain descriptor then either rereads the link value for the last chain descriptor or proceeds directly to the next chain descriptor specified by a previously read link value. For example, if the DMA unit completes the processing of the last chain descriptor of the first group and detects that the resume value has been set, the DMA unit rereads the link value of the last chain descriptor (which had previously been set to a null value) thereby receiving an updated link value specifying the first chain descriptor of the appended group. If the DMA unit detects that the resume value has been set upon completion of processing of a chain descriptor other than the last chain descriptor of the group, the reread of the link value for that chain descriptor will not yield a new link value. Rather, the reread link value will merely continue to specify the next chain descriptor in the group. Ultimately, once the DMA unit processes the last chain descriptor of the original group, the DMA unit merely reads the updated link value without requiring further reread operations. In other words, the DMA unit rereads the current link value only once when the resume value is reset. No further reread operations are required by the DMA unit unless, and until, the host processor appends an additional group of chain descriptors and sets the resume value accordingly. Operation of the DMA unit in reading the resume bit and, if necessary, rereading the link value of the last chain descriptor may be controlled by a simple state machine provided within the DMA unit. In one implementation, the resume value is a single bit value stored within the DMA unit.

Hence, dynamic appending of chain descriptors is achieved without requiring relatively slow and somewhat complicated software within the host processor and without resulting in significant time penalties. For DMA units capable of processing multiple channels of data simultaneously, a separate state machine and resume bit is preferably provided for each channel.

In accordance with another aspect of the invention, dynamic appending of chain descriptors is achieved by controlling the DMA unit to read a link value for a chain descriptor only once upon completion of the data transference operations specified by the chain descriptor. In other words, rather than reading a link value initially, then possibly rereading it upon the setting of the reset bit, the DMA unit merely reads the link value once upon completion of a data transference operation. Hence, no resume bit is required within the DMA unit. However, each chain descriptor read operation thereby requires two separate accesses to the host processor memory, perhaps resulting in an overall longer processing time than the embodiment wherein a resume bit is employed. In other words, in the alternative embodiment, two read operations are required for every chain descriptor regardless of whether the link value has been updated. In the previously described embodiment, two read operations are performed for a chain descriptor only if the resume bit was set while the chain descriptor is being processed. Nevertheless, the alternative embodiment may still represent a significant improvement over the software method of the prior art described above.

Thus, an improved method and apparatus for dynamically appending chain descriptors is provided and the objectives set forth above are achieved. Other objects, features and advantages of the invention will be apparent from the detailed description which follows and from the accompanying drawings.

DETAILED DESCRIPTION OF EXEMPLARY EMBODIMENTS OF THE INVENTION

With reference to the remaining figures, exemplary embodiments of the invention will now be described. The exemplary embodiments are described primarily with reference to block diagrams and flowcharts. As to the flowcharts, each block within the flowcharts represents both a method step and an apparatus element for performing the method step. Herein, the apparatus element may be referred to as a means for, an element for, or a unit for performing the method step. Depending upon the implementation, the apparatus element, or portions thereof, may be configured in hardware, software, firmware or combinations thereof. As to the block diagrams, it should be appreciated that not all components necessary for a complete implementation of a practical system are illustrated or described in detail. Rather, only those components necessary for a thorough understanding of the invention are illustrated and described. Furthermore, components which are either conventional or may be readily designed and fabricated in accordance with the teachings provided herein are not described in detail.

Figure 1:
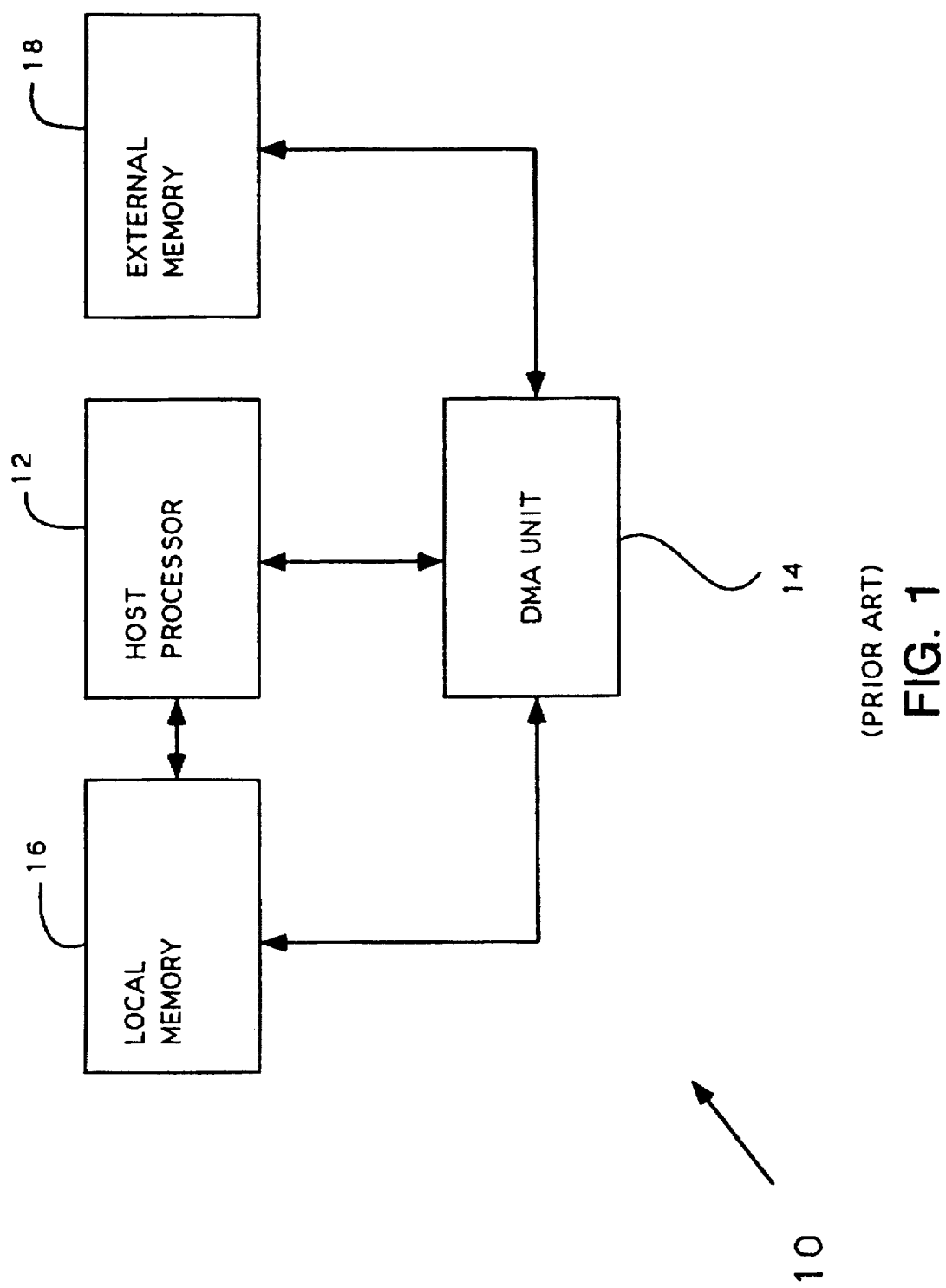
FIG. 1 is a block diagram of a computer system incorporating a DMA unit and configured in accordance with the prior art.
Figure 2:
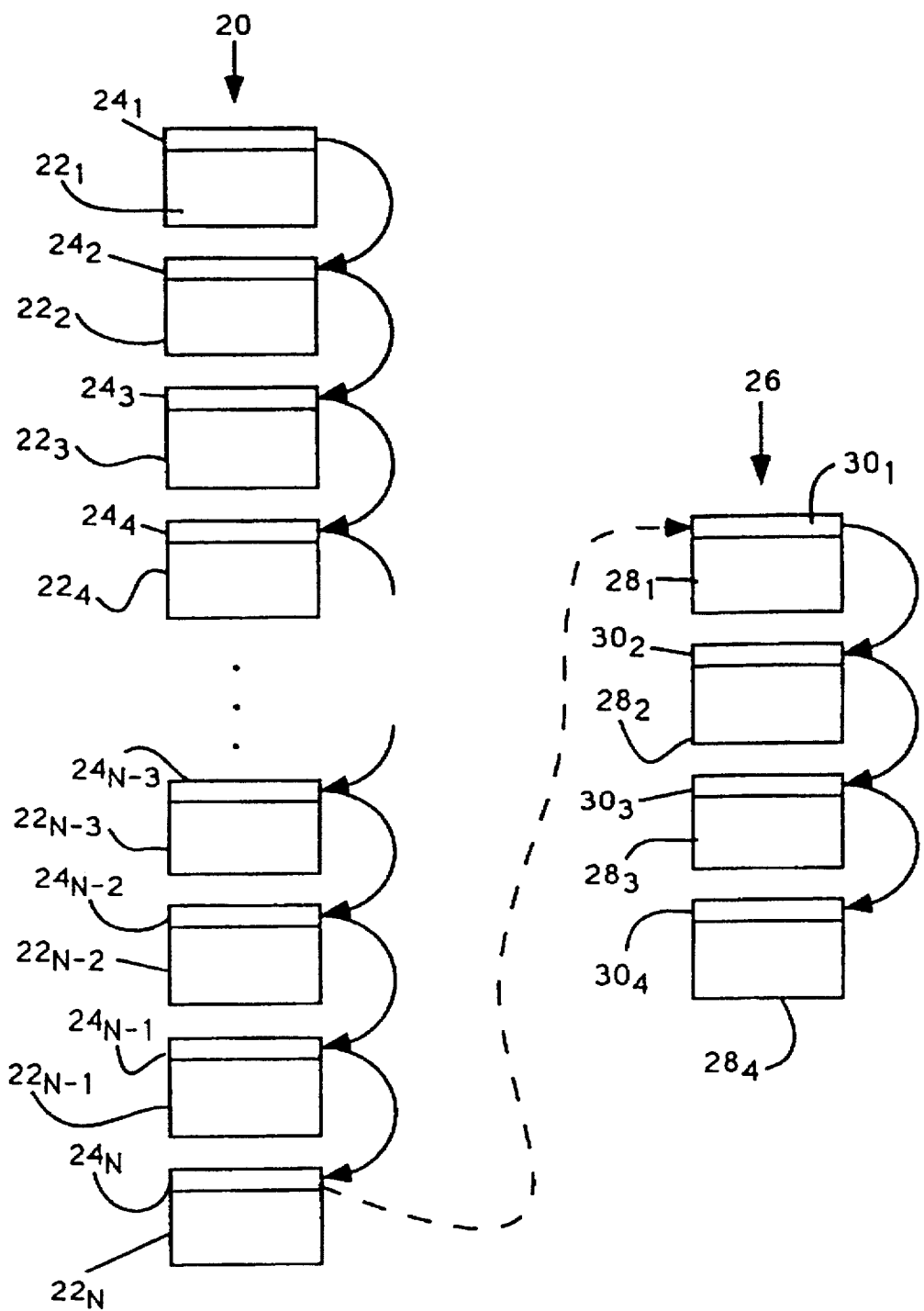
FIG. 2 is a block diagram illustrating two groups of chain descriptors specifying data transfer operations to be performed by the DMA unit of FIG. 1, also in accordance with the prior art.
Figure 3:
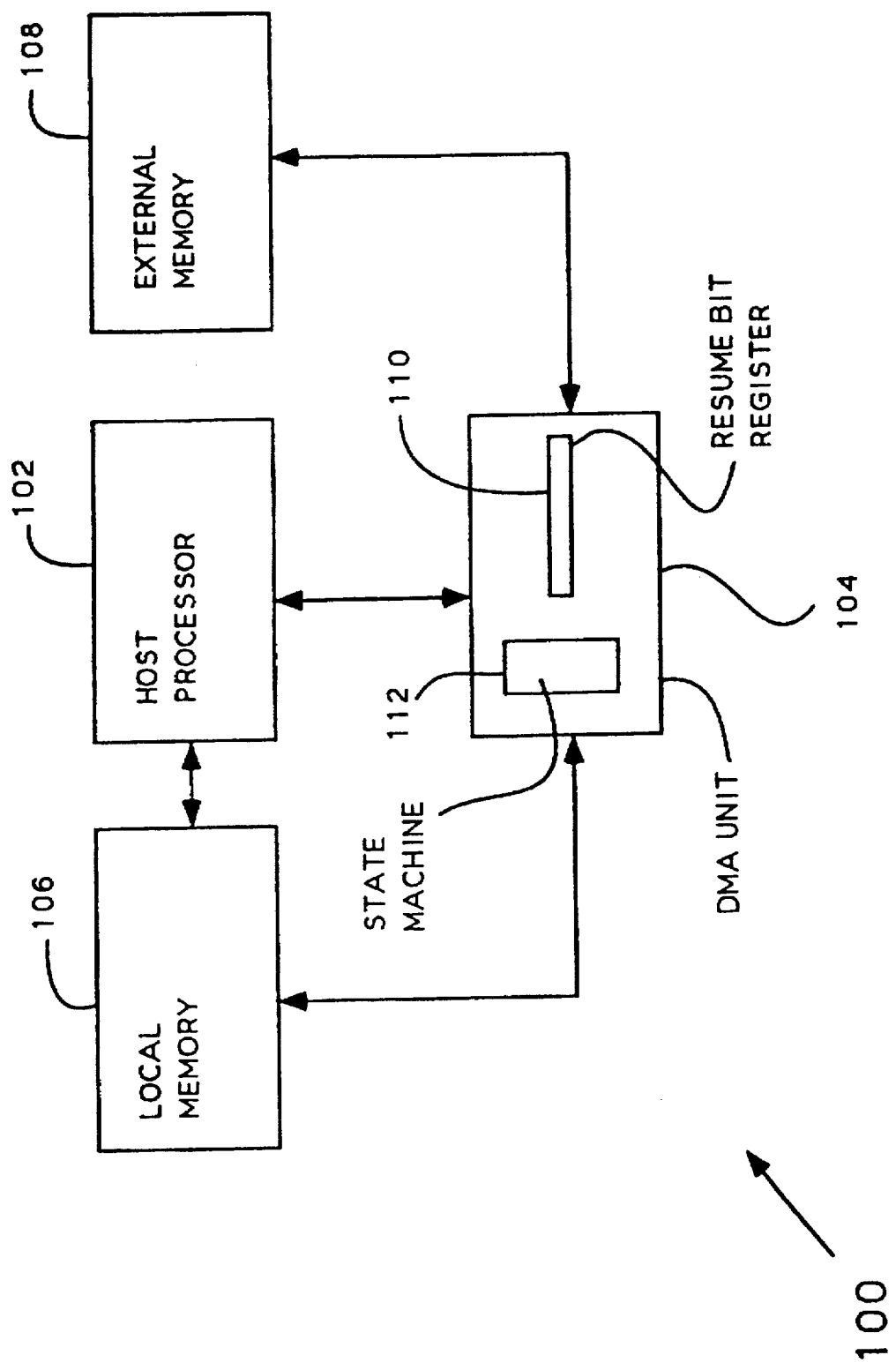
FIG. 3 is a block diagram of a computer system incorporating a DMA unit configured in accordance with an exemplary embodiment of the invention.

FIG. 3 illustrates a simplified computer system 100 having a microprocessor 102 and a DMA unit 104 which handles transference of data between a host memory 106 and an external memory 108. DMA unit 104 processes data transfer operations specified by chain descriptor data structures created by host processor 102 and stored within host memory 106. The chain descriptors are created by the microprocessor in groups with each individual chain descriptor including a link value identifying the address within host memory 106 of a data structure containing the next chain descriptor within the group. A link value of the last chain descriptor of a newly created group is set to a null value indicating the end of the group. Software is provided within microprocessor 102, to be described in detail below, allowing the microprocessor to update the link value of the last chain descriptor of the group to identify the first chain descriptor of a second group, thereby allowing a second group of chain descriptors to be appended to the first group of chain descriptors. Upon updating the link value of a chain descriptor, the software of the microprocessor also sets a resume bit stored within a register 110 within DMA unit 104. DMA unit 104 also includes a state machine 112 which, upon completion of the data transfer operation specified by a chain descriptor, examines the resume bit of register 110 and, if the bit is set, initiates a reread of the link value of the chain descriptor. Upon completion of the reread operation, the state machine resets the bit of register 110 to zero. In this manner, the DMA unit is capable of sequentially processing the chain descriptors of the appended group following completion of processing of the last chain descriptor of the previous group. This is achieved without the timing delay problems and software complexity burden problems of conventional systems described above.

Figure 4:
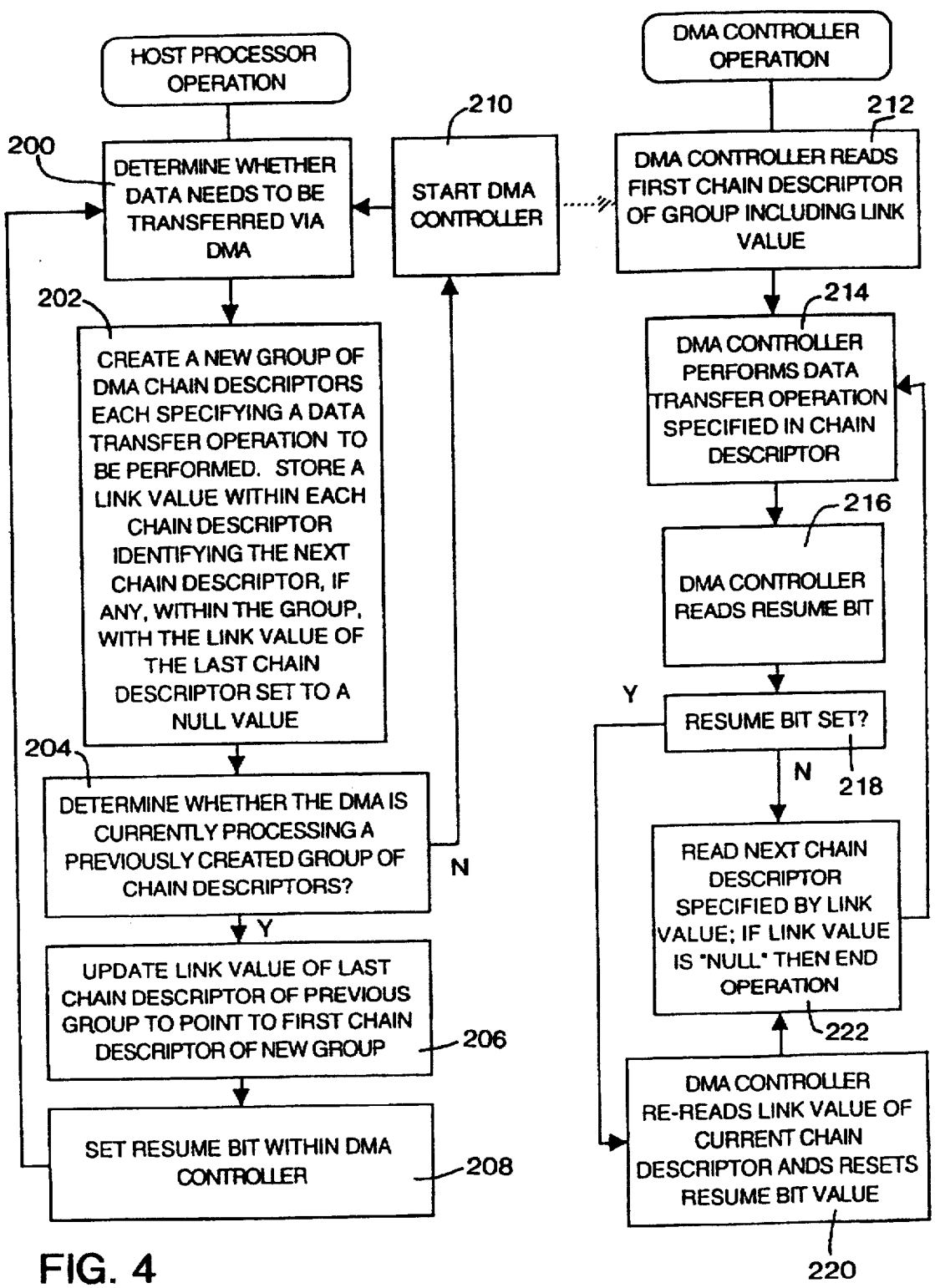
FIG. 4 is flow chart illustrating a method performed by the host processor and the DMA unit of the computer system of FIG. 3.

The method by which the host processor and DMA unit operate to achieve the foregoing results will now be described with reference to the flowchart of FIG. 4 and with further reference to the block diagram of exemplary chain descriptor groups of FIG. 5. FIG. 4 illustrates method steps performed by the host processor and method steps performed by the DMA unit. The method steps of the host processor and those of the DMA unit may be performed in parallel as the host processor and DMA unit are separate asynchronous devices. First, the operation of the host processor will be described. Initially, at step 200, the host processor determines whether data needs to be transferred via the DMA unit from one memory to another (such as from host memory 106 to external memory 108 of FIG. 3). At step 202, the host processor creates a group of DMA chain descriptors with each individual chain descriptor specifying a data transference operation to be performed by the DMA unit. Each chain descriptor may include, for example, the beginning address of a block of data to be transferred, the length of the data block to be transferred, the address to which the data is to be transferred and a link value identifying the address within the host memory of a next chain descriptor, if any, within the group of chain descriptors. If no additional chain descriptors are in the group, the link value is set to a null value or other suitable default value.

Next, at step 204, the host processor determines whether the DMA unit is currently processing a previously created group of chain descriptors. This may be accomplished by examining appropriate registers within the DMA unit such as those which temporarily store chain descriptor parameters. Accordingly, a determination of whether the DMA is currently processing a previously created group may be achieved in a manner similar to prior art techniques. If, at step 204, the host processor determines that the DMA unit is currently processing a previously created group of chain descriptors, then at step 206, the host processor updates the link value of the last chain descriptor of the previous group. Then, at 208, the host processor sets the resume bit within the DMA unit to indicate that a link value has been updated. Execution then returns to step 200 where the host processor may begin to create yet another group of DMA chain descriptors. If, at step 204, the host processor determines that the DMA unit is not currently processing a previously created group of chain descriptors, then the host processor starts the DMA unit, step 210. Again, execution returns to step 200 where the host processor determines whether additional chain descriptors need to be created.

The operation of the DMA unit will now be described. Once the DMA unit is started by the host processor (step 210), the DMA unit begins by reading all parameters from the first chain descriptor of the current group of chain descriptors, step 212. The address location of the first chain descriptor of the group of descriptors is provided to the DMA unit by the host processor during step 210 when the DMA unit is activated. The parameters read from the first chain descriptor at step 212 are stored internally within registers of the DMA unit (not separately shown herein). Next, at step 214, the DMA controller performs the data transference operation specified by the parameters of the chain descriptor previously read into the registers of the DMA unit. Upon completion of the data transference operation, at step 216, the DMA unit reads the resume bit (register 110 of FIG. 3) to determine whether the host processor has updated the link value of the last chain descriptor of the group. If the resume bit has been set, as determined at step 218, the DMA unit rereads the link value of the current chain descriptor, step 220, and stores the reread value in the corresponding link value register of the DMA unit. At step 220, the DMA unit also resets the resume bit value to zero. Execution then proceeds to step 222 where the DMA unit accesses the chain descriptor at the address location specified by the link value currently stored within the link value register of the DMA unit. The chain descriptor parameters accessed at step 222 are used to override previous values stored within the DMA unit. On the other hand, if current link value is null, then, at step 222, DMA terminates operation until restarted by the host processor following creation of a subsequent group of chain descriptors. Assuming that the link value is not null and the parameters corresponding to a next sequential chain descriptor are read into the DMA unit, execution returns to step 214 where the DMA unit operates to perform the data transfer specified by the current parameters. Execution of steps 214, 216, 218, 220 and 222 continues in a loop until a null link value is detected at step 222 causing termination of operations of the DMA unit.

Figure 5:
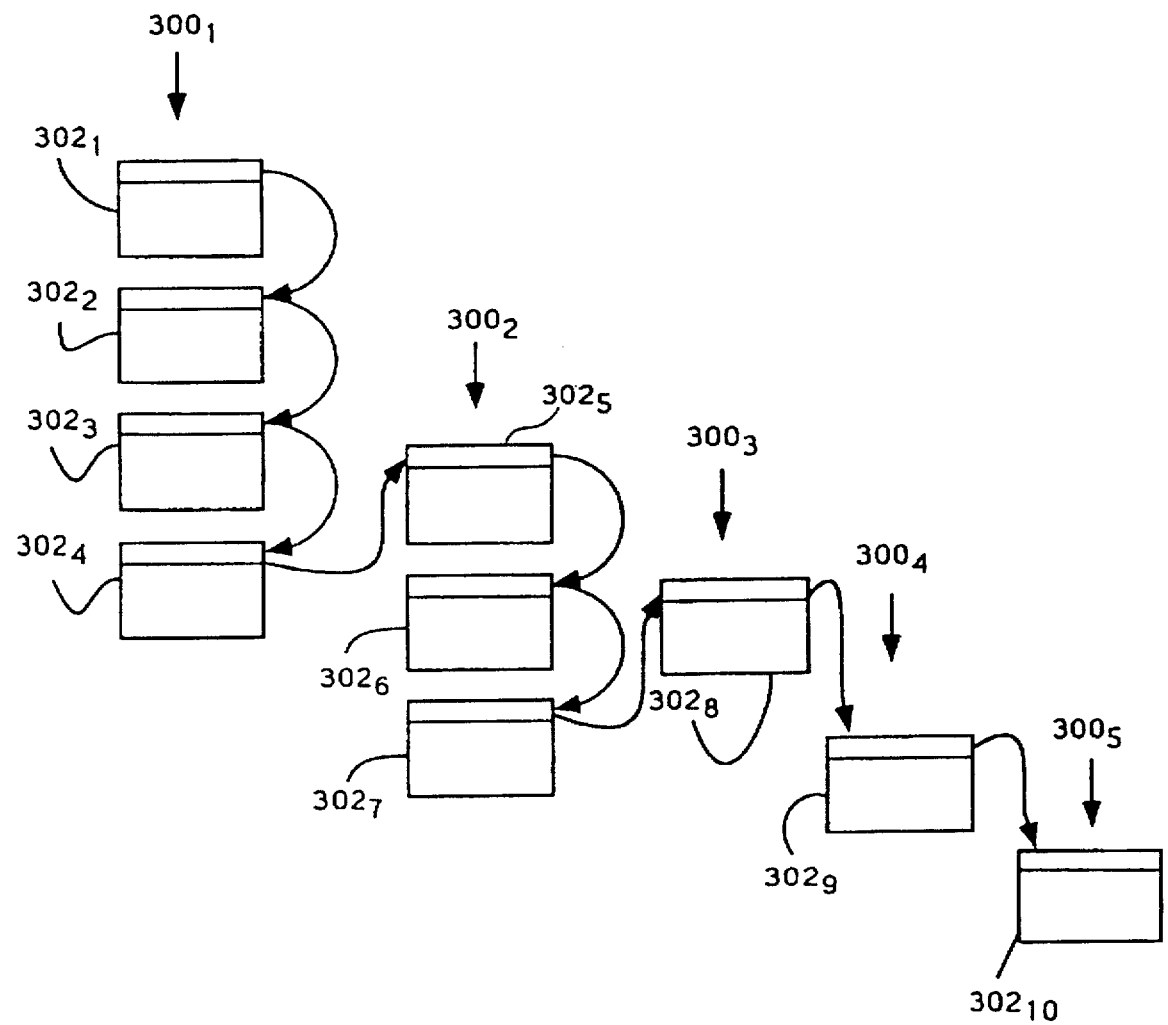
FIG. 5 is a block diagram of five groups of exemplary chain descriptors to be processed in accordance with the method provided in FIG. 4.

FIG. 5 illustrates an example of five groups of chain descriptors $300_1$–$300_5$ with individual chain descriptors identified by reference numerals $302_1$–$302_{10}$. As can be seen, three of the groups of chain descriptors each include only a single chain descriptor. The five groups of chain descriptors of FIG. 5 are created separately and sequentially by the host processor. Initially, only group $300_1$ is created with a link value of chain descriptor $302_4$ set to a null value indicating the end of the group. Next, the three chain descriptors of group $300_2$ are created triggering an update of the link value of chain descriptor $302_4$. The resume bit is also set within the DMA unit. When group $300_2$ is initially created, the link value of chain descriptor $302_7$ is initially set to a null value. The null value of $302_7$ is updated to point to chain descriptor $302_8$ upon creation of group $300_3$. Again, the resume bit is set. Similar steps are performed upon creation of chain descriptors $302_9$ and $302_{10}$ of groups $300_4$ and $300_5$, respectively. Unless additional chain descriptor groups are created subsequent to group $300_5$, the link value of the descriptor $302_{10}$ remains as a null value.

Thus far, only the operations of the host processor has been described with reference to the exemplary chain descriptors groups of FIG. 5. Now, with reference to Table I, below, the operation of the DMA unit in processing the chain descriptors of the example of FIG. 5 will be described. The chain descriptors are processed in sequence from $302_1$ to $302_{10}$. The first column of Table I identifies a relative time value. The second column of Table I identifies a chain descriptor being processed by the DMA unit. The third column of Table I identifies the corresponding link value. The third column of Table I identifies the corresponding status of the resume bit. The time values of the first column do not necessarily represent individual clock cycles. In many cases, the corresponding chain descriptor operation may require several clock cycles. In the example of Table I, the additional chain descriptor groups $300_2$–$300_5$ of FIG. 5 are created during processing of chain descriptors $302_4$, $302_6$, $302_8$ and $302_9$, respectively, which are identified with a resume bit of "1" in the corresponding row. In other words, chain descriptor $300_2$ of FIG. 5 is created by the host processor during processing of chain descriptor $302_4$ by the DMA unit. Chain descriptor group $300_3$ of FIG. 5 is created by the host processor during processing of chain descriptor $302_6$ by the DMA unit and so forth. The resume bit is set to 1 by the host processing during operations to indicate to the DMA unit that an additional chain descriptor group has been created. With regard to the link values of the third column, it should be noted that, within practical implementations, the actual link value stored within each chain descriptor is a binary value identifying the address of the next chain descriptor. In Table I, actual exemplary addresses are not provided within the third column. Rather, the third column merely provides the identity of the new chain descriptor pointed to by the link value. For some entries, the link value is identified as being "null". The null value appears as the link value within the last chain descriptor of the group if the host processor has not yet updated the link value to identify the first chain descriptor of a new group of chain descriptors.

TABLE I

| Time | Chain Descriptor Operation | Link Value | Resume Bit |
|---|---|---|---|
| $t_0$ | Chain Descriptor $302_1$ | Chain Descriptor $302_2$ | 0 |
| $t_1$ | Chain Descriptor $302_2$ | Chain Descriptor $302_3$ | 0 |
| $t_2$ | Chain Descriptor $302_3$ | Chain Descriptor $302_4$ | 0 |
| $t_3$ | Chain Descriptor $302_4$ | Null | 1 |
| $t_4$ | Reread Link Value | Chain Descriptor $302_5$ | 0 |
| $t_5$ | Chain Descriptor $302_5$ | Chain Descriptor $302_6$ | 1 |
| $t_6$ | Reread Link Value | Chain Descriptor $302_6$ | 0 |
| $t_7$ | Chain Descriptor $302_6$ | Chain Descriptor $302_7$ | 0 |
| $t_8$ | Chain Descriptor $302_7$ | Chain Descriptor $302_8$ | 0 |
| $t_9$ | Chain Descriptor $302_8$ | Null | 1 |
| $t_{10}$ | Reread Link Value | Chain Descriptor $302_9$ | 1 |
| $t_{11}$ | Reread Link Value | Chain Descriptor $302_9$ | 0 |
| $t_{12}$ | Chain Descriptor $302_9$ | Chain Descriptor $302_{10}$ | 0 |
| $t_{13}$ | Chain Descriptor $302_{10}$ | Null | 0 |

Considering the DMA unit operations with reference to Table I, initially the DMA unit performs a data transfer operations specified by chain descriptor values $302_1$-$t_0$ which includes a link value identifying chain descriptor $302_2$. Upon completion of operations corresponding to $302_1$, the DMA unit examines the current link value to determine the next chain descriptor to process. The current link value specifies a link to chain descriptor $302_2$ and the DMA unit proceeds to read all parameters from chain descriptor $302_2$-$t_1$ including a new link value specifying chain descriptor $302_3$. Execution continues in similar manner until chain descriptor $302_4$ is processed. Initially the link value of chain descriptor $302_4$-$t_3$ is a null value. However, upon completion of processing of the chain descriptor, the DMA unit detects that the resume bit has been set to "1" and thereby rereads the link value of chain descriptor $302_4$-$t_4$. Upon rereading the link value, the DMA unit receives an updated link value specifying chain descriptor $302_5$-$t_5$ which is subsequently processed. When the parameters of $302_5$-$t_5$ are initially read in, a link value to chain descriptor $302_6$ is initially read. Upon completion of the processing of descriptor $302_5$-$t_5$, the DMA unit detects that the resume bit has been set again (as a result of the host processor creating chain descriptor group $300_3$ of FIG. 5. Because the resume bit has been set, the DMA unit rereads the link value of chain descriptor $302_5$-$t_6$ which still points to chain descriptor $302_6$. Accordingly, the DMA unit clears the resume bit and proceeds to process chain descriptor $302_6$. Next, the DMA unit accesses chain descriptor $302_7$-$t_8$. Initially, the link value for $302_7$ was set to a null value (not shown in Table I). However, before the DMA unit begins processing chain descriptor $302_7$, the host processor has already updated the link value contained therein. Hence, no reread operations by the DMA unit are required during processing of chain descriptor $302_7$.

The DMA unit continues to process the remaining chain descriptors in order with link value reread operations occurring following completion of processing of chain descriptors $302_7$-$t_8$ and $302_8$-$t_9$. Ultimately, DMA operation is terminated upon detection of a null link value within chain descriptor $302_{10}$-$t_{12}$.

Hence, Table I helps illustrate that the DMA unit rereads the link value of the current chain descriptor upon detecting a set resume bit even if the DMA unit is not processing the last chain descriptor of the group. Hence, in many cases, the DMA unit will reread the link value which has not been changed. With this implementation, the DMA unit need not even determine whether it is processing the last chain descriptor and need not determine whether the link value of the current chain descriptor has been changed. Rather, the DMA unit merely rereads the current link value and uses whatever link value is retrieved to access the next chain descriptor.

As a result of processing delays, situations might arise where the host processor updates the link value for the last DMA chain descriptor and the DMA unit completes processing of that chain descriptor before the host processor can set the resume bit. In such a circumstance, the DMA unit terminates the operation based upon detection of a null value in the originally read link value. Conventional logic may be provided within the host processor for detecting the termination of operation of the DMA unit and for restarting the DMA unit. However, it is anticipated that such a circumstance will be rare.

With reference to the remaining Figures, an alternative method for appending chain descriptors will be described. In an alternative method, no resume bit is required. Rather, the DMA unit is configured to read the link value for a chain descriptor only upon completion of the data transfer specified by the chain descriptor. As with the previous embodiment, however, the host processor updates the link value upon creation of a subsequent group. Because the DMA unit does not initially read the link value from the chain descriptor, the DMA unit need not reread the link value. Rather, the DMA unit merely reads the link value upon completion of the DMA operation and proceeds to the next chain descriptor specified by the link value. In other words, the update of the link value by the host processor is transparent to DMA unit.

Figure 6:
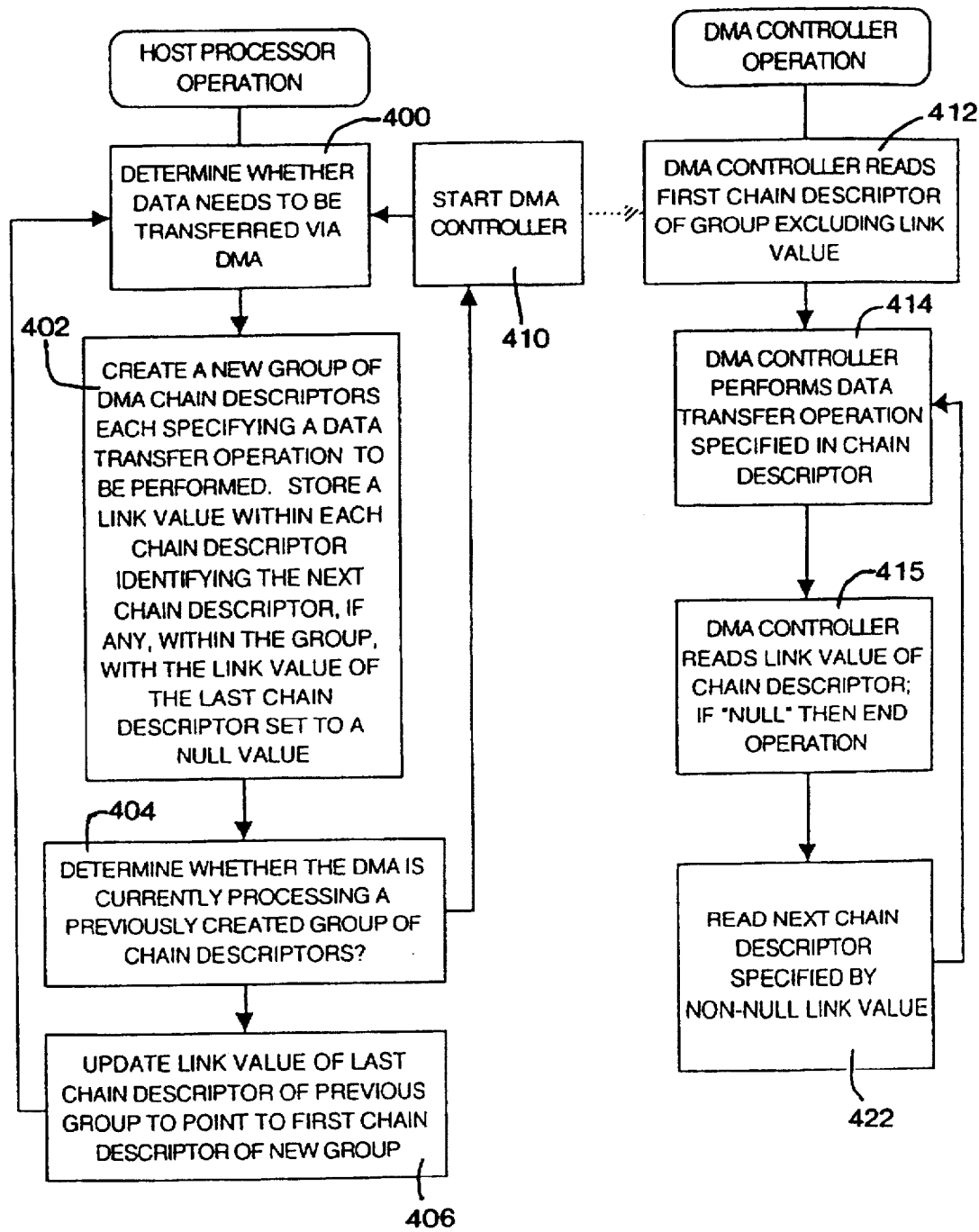
FIG. 6 is a flowchart illustrating an alternative method for processing chain descriptors.

The foregoing steps are summarized in the flowchart of FIG. 6. The flowchart of FIG. 6 is similar to that of FIG. 4 and like blocks are identified by like reference numerals incremented by 200. Only the differences between the two flowcharts will be described. First considering the host processor operation, the method of FIG. 6 does not include a corresponding step 208 of FIG. 4 because no resume bit needs to be set. As to the operation of DMA unit, at step 412, the DMA unit reads the first chain descriptor parameters excluding the link value. Following step 414, the DMA unit reads the link value of the current chain descriptor, step 415, (which has no counterpart in the flowchart of FIG. 4). Then, at step 422, the DMA unit reads the chain descriptors specified by the just read link value. If the link value is null, operation terminates. If the link value is not null, then execution returns to step 414 where the DMA controller performs the data transference operation specified by the chain descriptor identified by the current link value.

Thus, FIG. 6 illustrates a method wherein dynamic appending of chain descriptors can be performed without requiring a resume bit within the DMA unit and without requiring any reread operations of link values. However, the method of FIG. 4 requires that data for each chain descriptor be read into separate read operations. The first read operation provides all parameters except the link value. The second read operation, performs subsequent to a processing of the data transfer, provides the link value. The need to provide two separate operations for each chain descriptor can result in greater processing time requirements over the method of FIG. 4 wherein two read operations are performed for a given chain descriptor only when the resume bit is set. Depending upon the implementation, the additional read operation for each chain descriptor of the method of FIG. 6 may require several more clock cycles per chain descriptor. Indeed, for computer systems wherein one or more wait states are required upon completion of each data transfer from the host memory to the DMA unit, the need to perform two separate read operations may result in a significant increase in the number of required clock cycles. Nevertheless, the method of FIG. 4 is, in most implementations, still a significant improvement over conventional techniques wherein software within the host microprocessor first determines which chain descriptor is currently being processed by DMA unit and then proceeds accordingly, perhaps suspending operations of the DMA unit if the DMA unit is found to be processing the next last chain descriptor of the preceding group.

Figure 7:
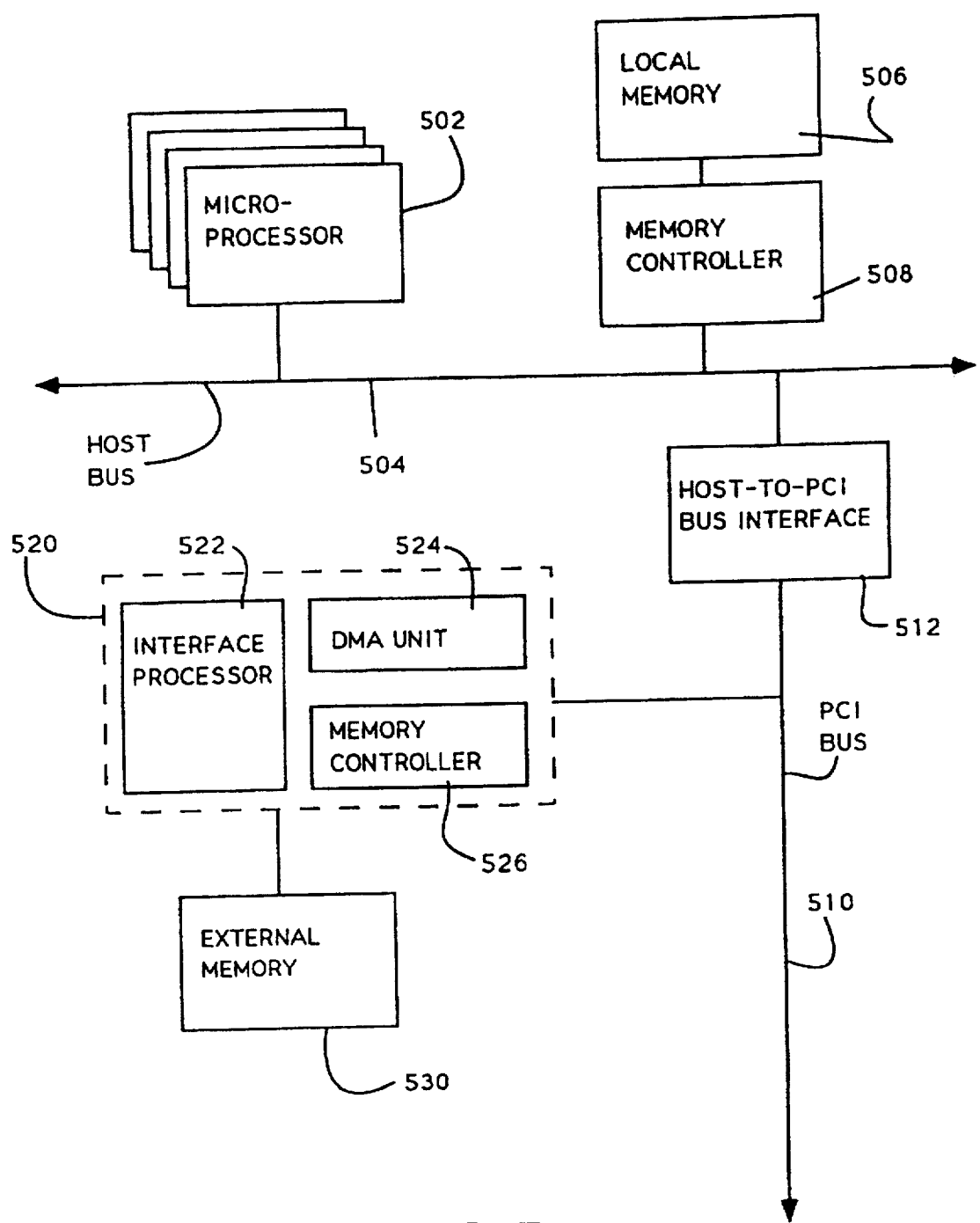
FIG. 7 is a block diagram of a specific exemplary computer system configured to perform DMA transfers between a host computer bus and a PCI bus in accordance with the methods of FIG. 4 or 6.

FIG. 7 illustrates a specific exemplary embodiment of a computer system in which either of the two basic methods for dynamic appending of chain descriptors may be employed. More specifically, FIG. 7 illustrates a computer system 500 having one or more microprocessors 502 interconnected by a host bus 504 to a main memory 506 through a memory controller 508. Host bus 504 is connected to a PCI bus 510 through a host to PCI interface unit 512.

Interface unit 520 includes a DMA unit 524, an interface processor 522 and a memory controller 526. An external memory 530 is connected to interface unit 520 through a memory controller 526. With this configuration, DMA unit 524 of interface unit 520 handles data transfer operations between external memory 530 and host memory 506 under the control of interface processor 522. In other words, interface processor 518, rather than one of the host processors 522, creates the groups of chain descriptors which control DMA unit 524. The chain descriptors created by interface processor 522 are stored through a memory controller unit 526 to the external memory 530. If implemented using the first method and apparatus described above, DMA unit 524 includes a register storing a resume bit and interface processor 522 updates link values stored within memory 530 and sets the resume bit within DMA unit 524, in accordance with the method described above with reference to FIG. 4. If implemented in accordance with the second method and apparatus described above, then DMA unit 524 does not require a resume bit register. Rather, DMA unit 524 is configured to perform two separate read operations for each chain descriptor stored within memory 530 with the first operation reading all parameters of the chain descriptor except the link value. The second read operation reads the link value. Again, interface processor 522 handles actual updating of the link value of the chain descriptors of memory 530.

Although computer system 500 of FIG. 7 may be implemented with a wide variety of specific components, exemplary components include Pentium® or Pentium Pro® host processor chips as host processors 502 and an Intel i960®RP processor as interface processor 520. Pentium® processor, Pentium Pro® processor, i960® processor, and Intel® are trademarks of Intel Corporation, the assignee of rights to the present application.

What has been described are two basic embodiments of a method and apparatus for dynamically appending chain descriptors within the computer system incorporating the DMA unit. Principles of the invention may be applied in accordance with other methods and apparatus to achieve dynamic chain descriptor appending or similar results. Accordingly, the exemplary embodiments described herein should be regarded as being merely illustrative of the invention and should not be construed as limiting the scope of the invention.

What is claimed is:

1. In a computer system having a processor and a direct memory access (DMA) controller wherein the processor creates groups of chain descriptors each identifying portions of data to be processed by the DMA controller and wherein each of the chain descriptors includes a link value identifying a next chain descriptor within the group, if any, an improvement comprising:

updating means within the processor for updating the link value of a last chain descriptor of a group of chain descriptors upon the creation of a subsequent group of chain descriptors, said link value being updated to identify a first chain descriptor of said subsequent group of chain descriptors;

storing means within the DMA controller for storing an update condition value identifying whether the processor has updated the link value of the last chain descriptor of a group of chain descriptors; and examining means within the DMA controller for examining the update condition value and for rereading the link value of the current chain descriptor if the update condition value has been set and for not reading the link value otherwise.

2. The improvement of claim 1 wherein the updating means includes software operating within the processor for updating the link value of a last chain descriptor of a group of chain descriptors.

3. The improvement of claim 2 wherein the storing means comprises:

a register of the DMA controller.

4. The improvement of claim 3 wherein the storing means further includes software operating within the processor for setting the update condition value of the register of the DMA controller.

5. The improvement of claim 1 wherein the examining means comprises:

a state machine of the DMA controller.

6. A method for performing data transfers under the control of a DMA controller, said method comprising the steps of:

reading a chain descriptor identifying a data transfer operation to be performed by the DMA controller and identifying a subsequent chain descriptor, if any, corresponding to a subsequent data transfer to be performed;

performing the data transfer operations identified in the chain descriptor;

upon completion of performing the data transfer operation, determining whether the link value of the chain descriptor has been modified; and if the link value has been modified, rereading the link value of the chain descriptor, then performing the data transfer operation of the chain descriptor identified by the reread link value or if said value has not been set, then reading the chain descriptor identified by the link value initially read from the chain descriptor.

7. A method for performing data transfers under the control of a DMA controller and a processor, said method comprising the steps of:

creating a group of chain descriptor data structures each identifying data to be transferred by the DMA controller;

storing a link value within each chain descriptor identifying a subsequent chain descriptor, if any, within the group of chain descriptors;

reading a chain descriptor, including its corresponding link value, identifying portions of data to be processed by the DMA controller and identifying a subsequent chain descriptor, if any, corresponding to a subsequent portion of data to be processed;

transferring the data identified in the chain descriptor;

upon completion of transferring the data, determining whether the link value of the chain descriptor has been modified during transference of the data; and if said link value has been modified, rereading the link value of the chain descriptor, then reading and processing the chain descriptor identified by the new link value; or if said value has not been set, then reading and processing the chain descriptor identified by the link value initially read from the chain descriptor.

8. A method for creating groups of chain descriptors for use with the DMA controller, said methods comprising the steps of:

determining whether data needs to be transferred using the DMA controller;

creating a new group of DMA chain descriptors, each specifying a data transfer operation to be performed;

storing a link value within each chain descriptor identifying the next chain descriptor, if any, within the group, with the link value of the last chain descriptor set to a null value;

determining whether the DMA is currently processing a previously created group of chain descriptors;

if so, updating the link value of a last chain descriptor of a previous group of chain descriptors to point to a first chain descriptor of the new group; and setting an update condition value which identifies that the last chain descriptor of the previous group has been updated.

9. A data transfer system comprising:

a processor;

a DMA controller connected to said processor;

creating means within the processor for creating groups of chain descriptors with each chain descriptor having a link value identifying a subsequent chain descriptor, if any, within the group;

modifying means within the processor for modifying the link value of a last chain descriptor within a group of chain descriptors upon the creation of a subsequent group of chain descriptors;

storing means within the DMA controller for storing an update condition value representative of whether the processor has modified the link value of the last chain descriptor;

updating means within the processor for updating the update condition value within the DMA; and examining means within the DMA controller for examining the update condition value and, if set, for rereading the link value for the most recently processed chain descriptor data structure.

10. The data transfer system of claim 9 wherein the modifying means includes software operating within the processor for modifying the link value of a last chain descriptor within a group of chain descriptors.

11. The data transfer system of claim 9 wherein the storing means comprises:

a register of the DMA controller.

12. The data transfer system of claim 11 wherein the storing means further includes software operating within the processor for setting the update condition value of the register of the DMA controller.

13. The data transfer system of claim 9 wherein the examining means comprises:

a state machine of the DMA controller.

14. A data transfer system comprising:

a processor;

a memory;

a DMA controller;

a unit within the processor for creating groups of chain descriptors within the memory with each chain descriptor having a link value identifying a subsequent chain descriptor, if any, within the group;

a unit within the processor for updating a link value of a last chain descriptor of a group of chain descriptors upon the creation of a subsequent group of chain descriptors, said value being updated to identify a first chain descriptor of said subsequent group of chain descriptors;

a unit within the DMA controller for storing an update condition value representative of whether the processor has modified the link value of the last chain descriptor; and a unit within the DMA controller for examining the update condition value and, if set, for rereading the link value for the most recently processed chain descriptor data structure.

* * * * *